United States Patent [19]

Stewart

[11] Patent Number: 5,797,779
[45] Date of Patent: Aug. 25, 1998

[54] BODYBOARD WITH DIFFERENTIATED TOPSKIN

[76] Inventor: Michael A. Stewart, 22345 LaPaloma Ave., Unit 102, Yorba Linda, Calif. 92687

[21] Appl. No.: 598,249

[22] Filed: Feb. 8, 1996

[51] Int. Cl.$^6$ .................................................. A63C 15/00
[52] U.S. Cl. .................................................. 441/74; 441/65
[58] Field of Search .................................. 441/65, 74, 79; 114/39.2; D21/228, 229, 236

[56] References Cited

U.S. PATENT DOCUMENTS

| D. 337,432 | 7/1993 | Caffiero. |
| D. 342,114 | 12/1993 | Healy. |
| D. 349,741 | 8/1994 | McIntyre. |
| D. 351,636 | 10/1994 | Newton ............ D21/228 |
| 1,552,603 | 9/1925 | Hawks ............ 441/65 |
| 1,608,000 | 11/1926 | Ranlett ............ 441/65 |
| 3,755,063 | 8/1973 | Massey et al.. |
| 3,889,032 | 6/1975 | Koelsch. |
| 4,028,761 | 6/1977 | Taylor. |
| 4,062,711 | 12/1977 | Davis. |
| 4,129,911 | 12/1978 | McDonald et al.. |
| 4,437,842 | 3/1984 | Connor. |
| 4,596,839 | 6/1986 | Peters. |
| 4,659,618 | 4/1987 | Vazaki et al.. |
| 4,752,260 | 6/1988 | Stewart. |
| 4,753,836 | 6/1988 | Mizell. |
| 4,798,549 | 1/1989 | Hirsch. |
| 4,806,412 | 2/1989 | Wank et al.. |
| 4,886,476 | 12/1989 | Brocone et al.. |
| 4,894,034 | 1/1990 | Brown, III ............ 441/65 |
| 4,953,494 | 9/1990 | McClendon, Jr.. |
| 4,961,715 | 10/1990 | Shanelec. |
| 5,106,331 | 4/1992 | Lizarazu. |
| 5,273,470 | 12/1993 | Sneddon et al.. |
| 5,318,467 | 6/1994 | McIntyre. |
| 5,338,238 | 8/1994 | Gillis. |

Primary Examiner—Edward L. Swinehart
Attorney, Agent, or Firm—Kolisch, Hartwell, Dickinson, McCormack & Heuser

[57] ABSTRACT

A bodyboard is provided having a top riding surface with a centralized torso-supporting region of generally hourglass shape and perimetric purchase-enhancing region which surrounds the torso-supporting region.

22 Claims, 7 Drawing Sheets

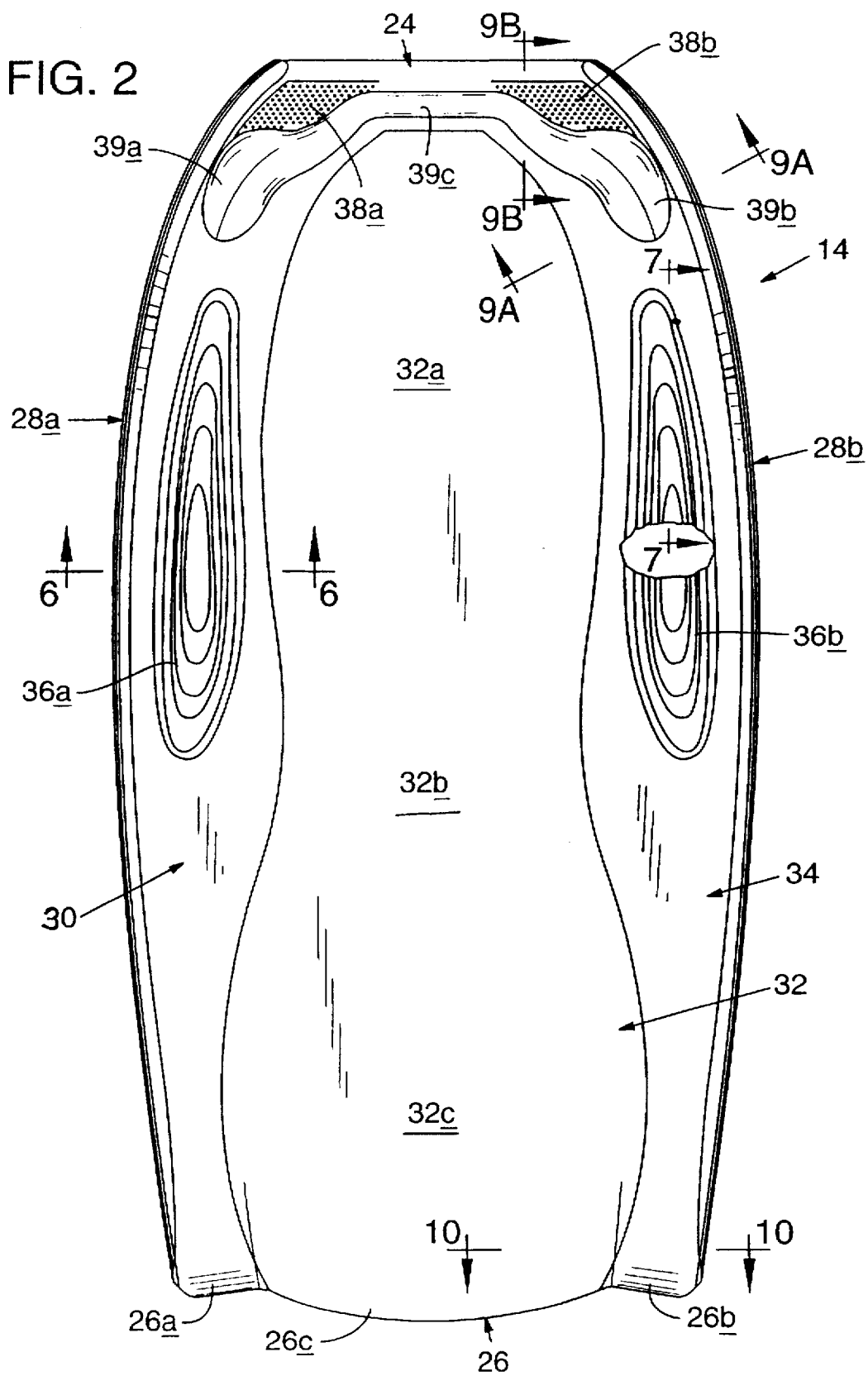

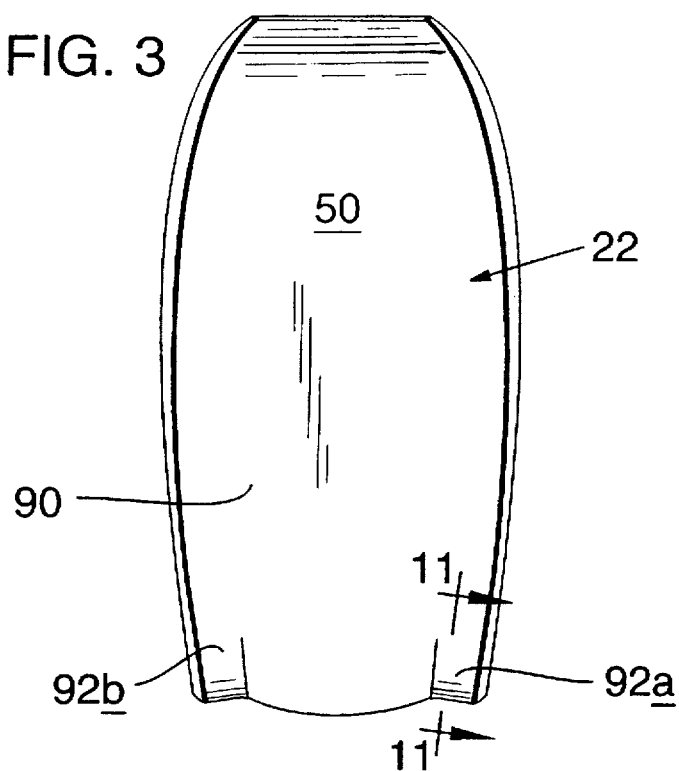
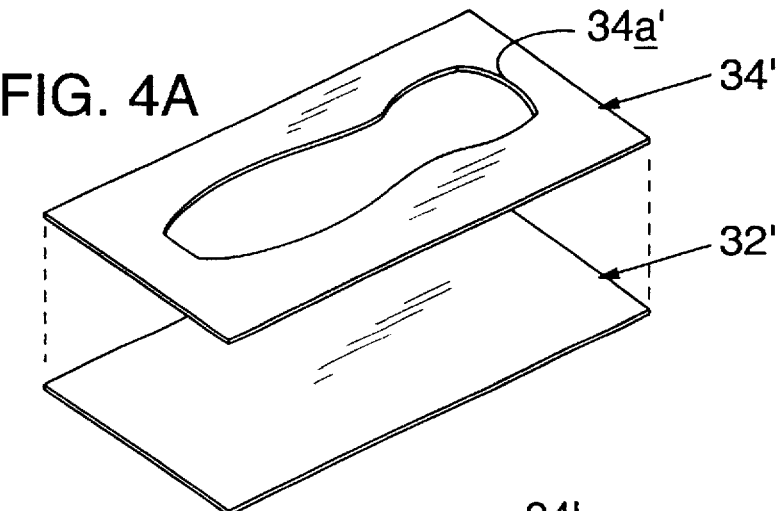
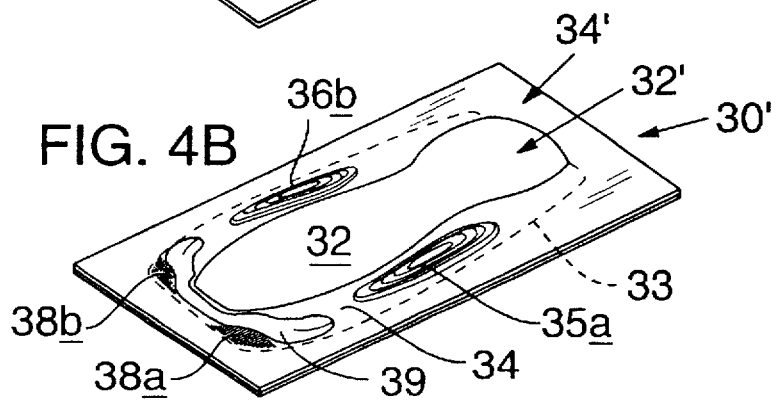

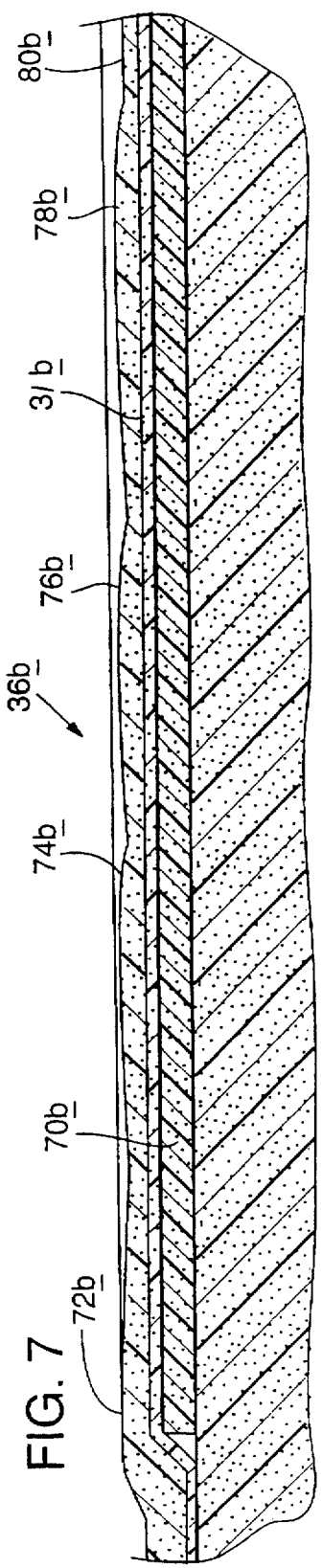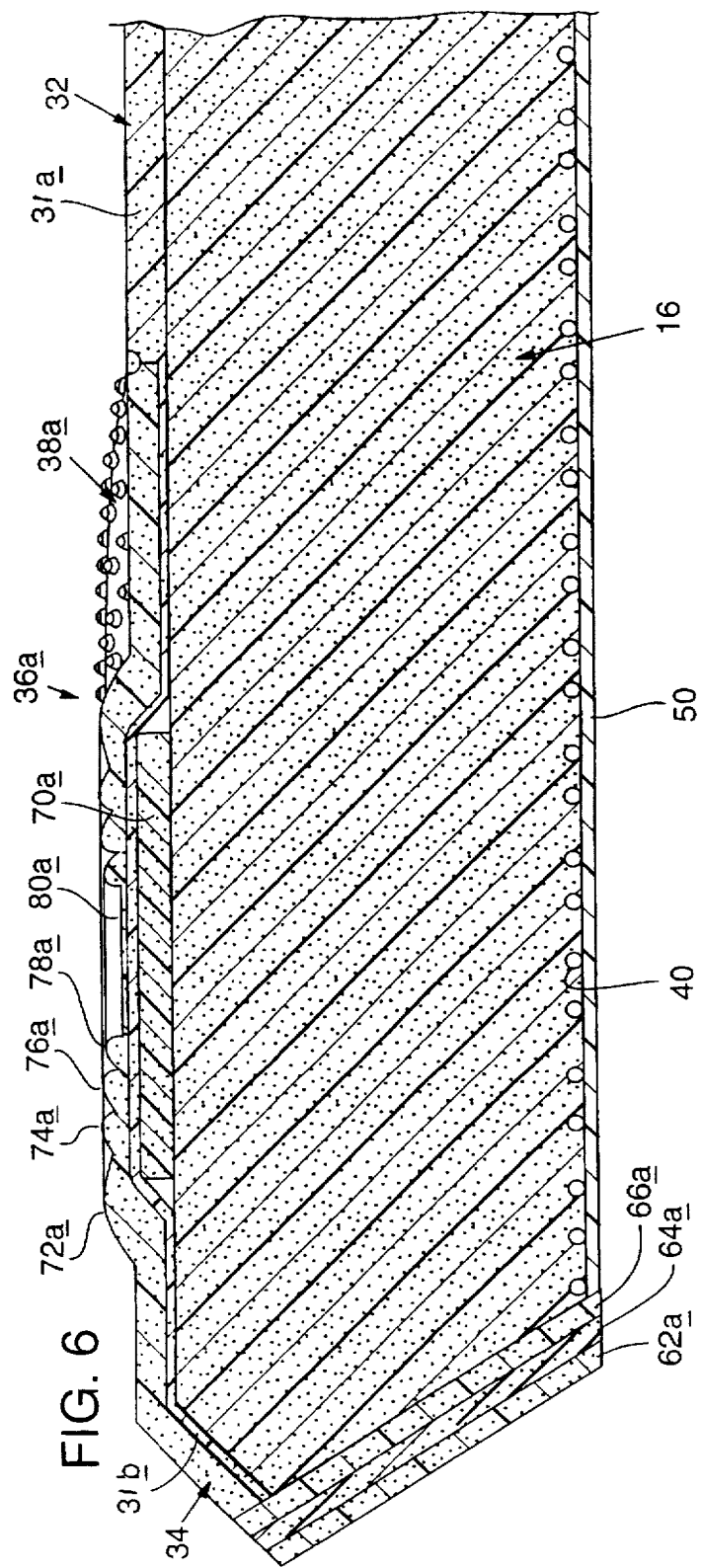

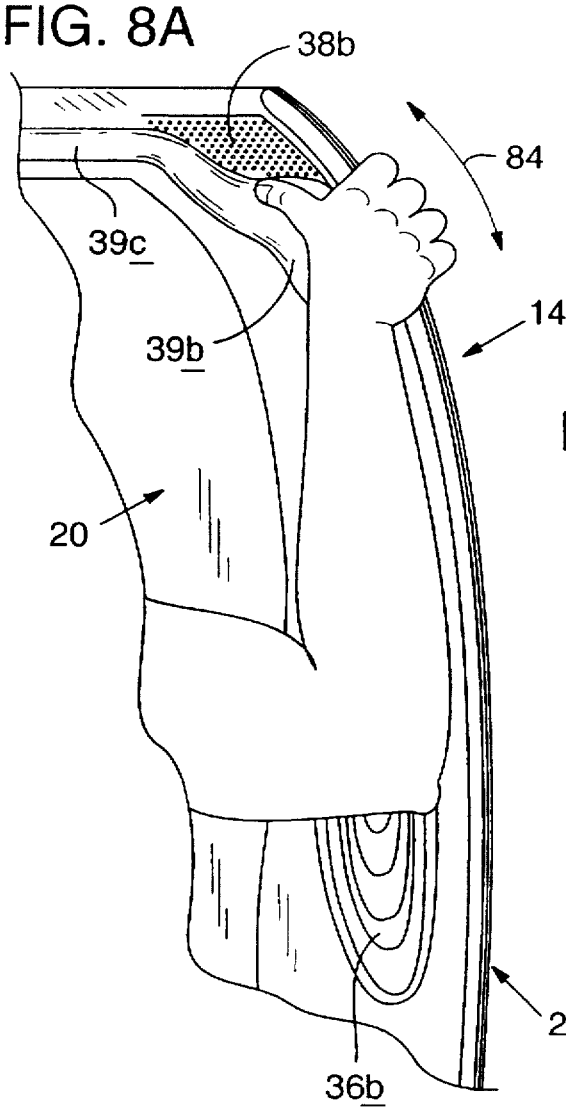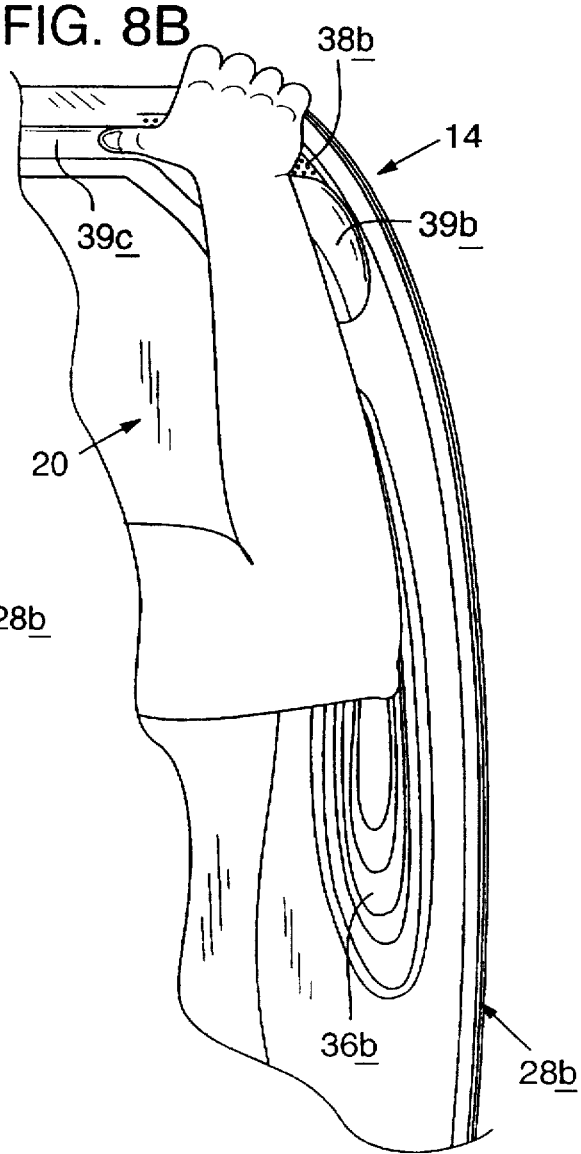

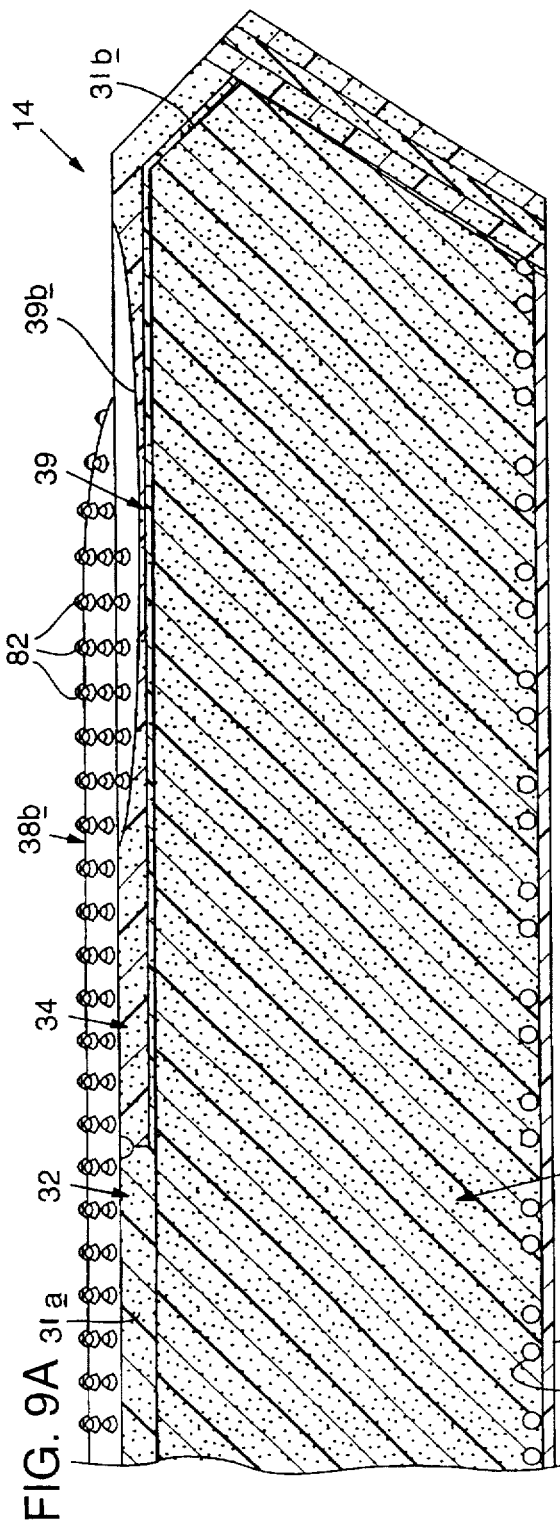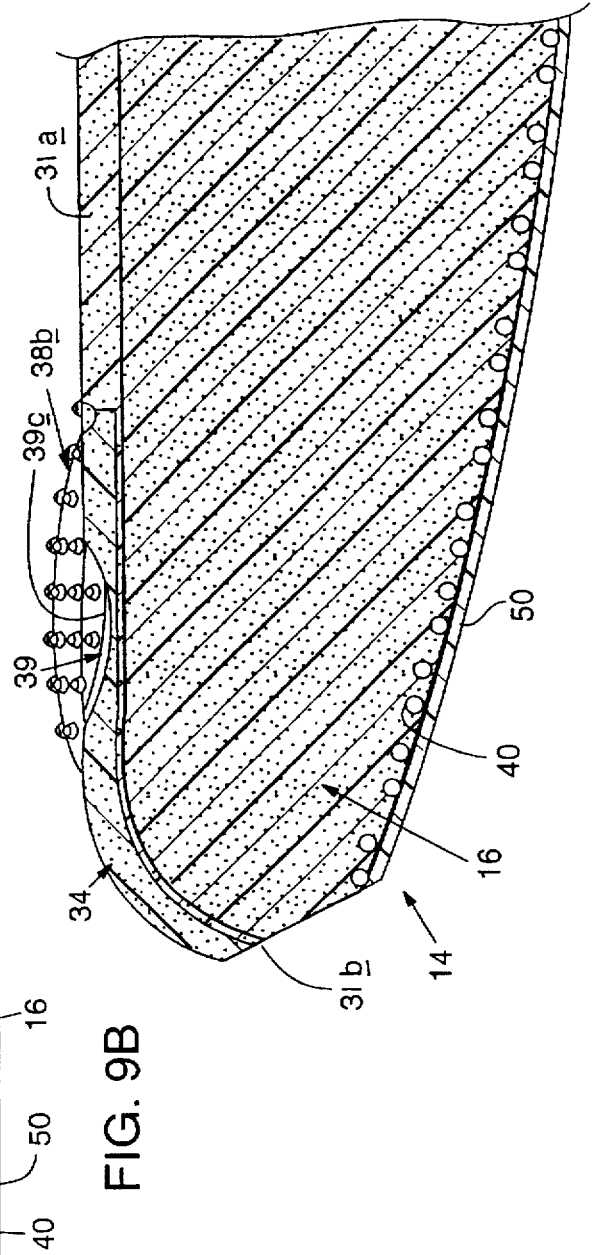

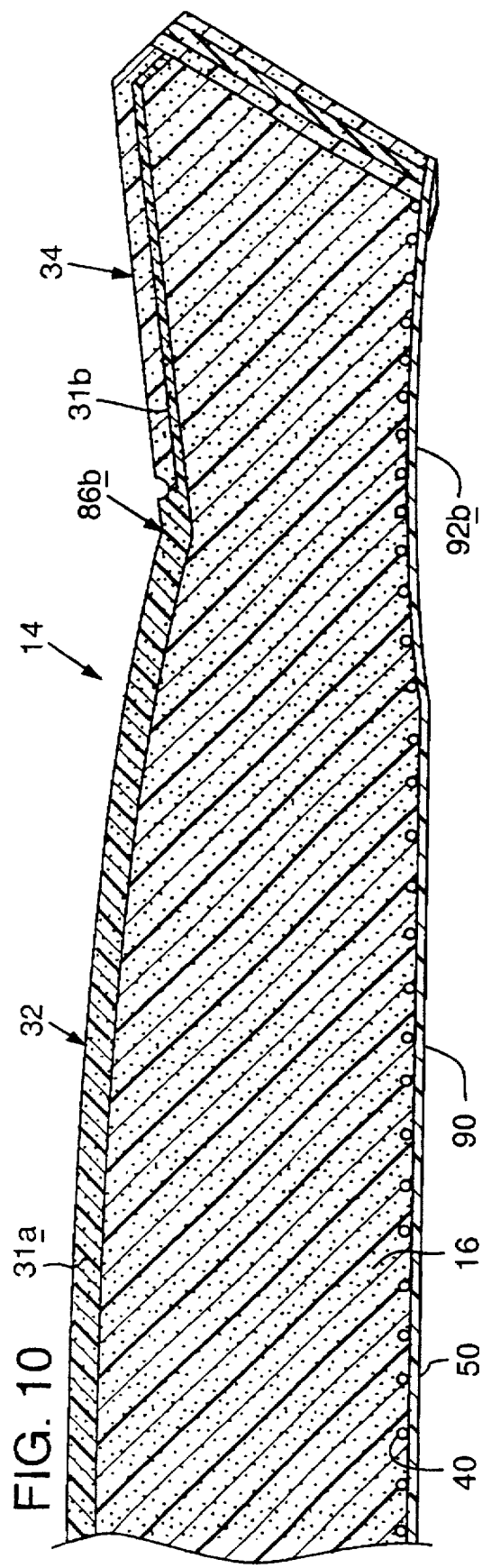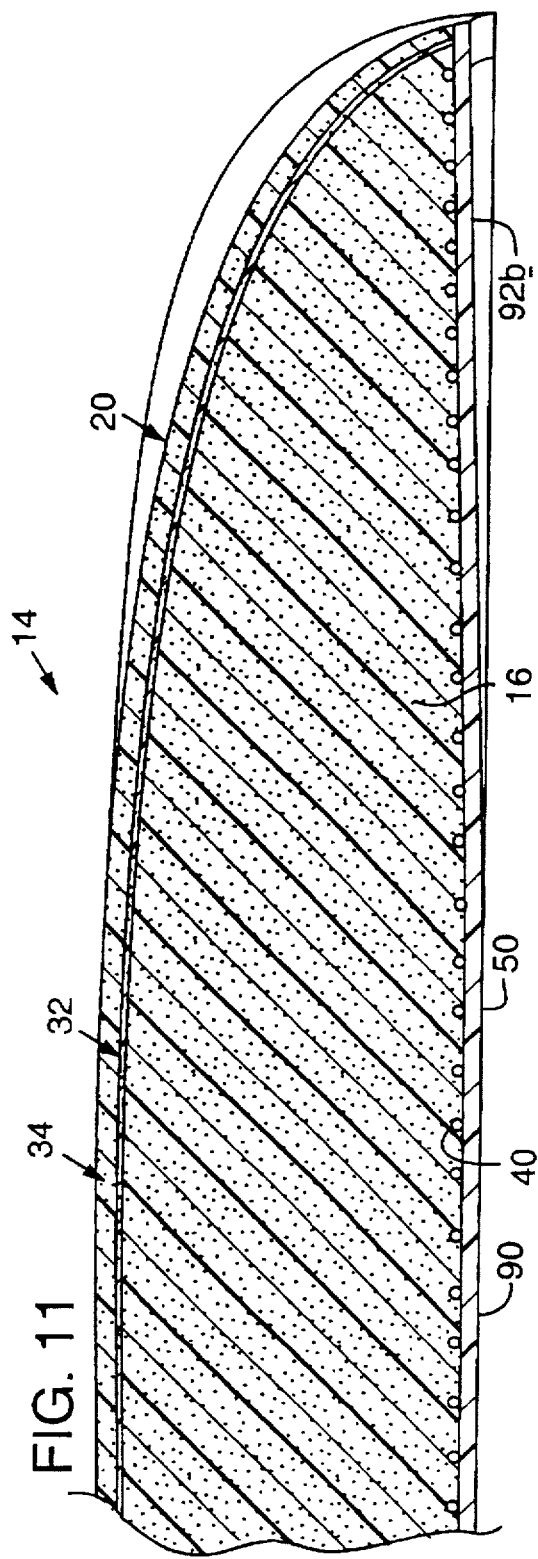

BODYBOARD WITH DIFFERENTIATED TOPSKIN

TECHNICAL FIELD

The present invention relates generally to recreational products. More particularly, the invention relates to a bodyboard for use in supporting a rider during travel in ocean surf, the bodyboard including a topskin with a centralized torso-supporting region and a perimetric purchase-enhancing region.

BACKGROUND AND SUMMARY OF THE INVENTION

Bodyboards are floatation devices somewhat similar to surfboards, the major differences being that bodyboards are shorter in length, lighter in construction, and generally are more flexible. Typically, bodyboards are formed from elongate, semi-rigid foam planks, the finished board including a top riding surface and a bottom planing surface. The planing surface is slick to enhance bodyboard travel. The riding surface is contoured to enhance the rider's ability to remain on the board. Such purchase-enhancing features are, for example, described in U.S. Pat. Nos. 4,752,260 and 5,273,470. The disclosures of these patents are incorporated herein by this reference.

As is well known, bodyboard enthusiasts most often ride their boards in a prone position, one arm extending forwardly to grip the forward end (or nose end) of the board and the other arm extending along the rider's side to grip one of the board's side edges. Control is exercised by pushing or pulling against the board's forward end and/or side edges, bending or twisting the board to effect a turn. Most commonly, the rider's elbow is used as a fulcrum, about which the rider bends the board to direct travel. The position of the rider's board-gripping hand determines the manner in which the board is bent. Accordingly, it should be apparent that the rider's grip is extremely important to maintaining bodyboard control.

Additionally, the rider's torso and legs play a role in maneuvering the board, most often a result of the position of the rider's torso on the board. It will be appreciated, for example, that shifting the rider's weight to the left will tend to turn the board to the left. Shifting the rider's weight to the right will have a similar, but opposite, effect. If the rider's torso passes over the side edge of the board, control likely will be lost. The rider's torso thus generally is positioned centrally over the riding surface of the bodyboard. The rider's legs, which typically extend rearwardly, are used to direct the board in a manner similar to the manner in which a rudder is used to direct a boat.

Despite the close relationship required between the rider and the board, bodyboarding has become a fast-paced sport characterized by maneuvers involving forces which tend to separate the rider from his or her board. These maneuvers typically include daring and precise turns which require a high degree of coordination and a considerable amount of control over the board. Consequently the rider must maintain close association with the board, and must be able to grip the board securely, a task which may be difficult in view of the speeds involved, the trajectory of a planing board, and the water which usually covers the board during use.

As a result of the above-cited factors, riders of conventional boards have tended to plane off the surface of the board, prematurely ending the ride. Bodyboards have thus been provided which attempt to improve board grippability, such boards having blunt forward ends intended to provide riders with a handhold which may be comfortably gripped with the hand of a forwardly-extending arm. Similarly, conventional bodyboards have been given side edges configured for gripping by the rider's hand, and riding surfaces with ridges or grooves intended to enhance rider purchase. The bodyboards described in U.S. Pat. No. 4,752,260 and U.S. Pat. No. 5,273,470 are illustrative.

Despite these provisions, however, there remains room for improvement. For example, because bodyboards generally are flat, a rider's hands may easily slip off the nose end or the side edge of the board, resulting in an aborted or out-of-control ride. Similarly, the rider's elbow (about which the board is pivoted to effect sharp turns) may slide off the board's riding surface, again leading to a loss of board control. Uncontrolled shift of the rider's torso is yet another common problem, such shift further impeding enjoyment of the bodyboarding experience. In any case, for a rider to perform long, drawn-out turns, short "snappy" turns, or the wide variety of other maneuvers common to bodyboard competitions, the board must provide for stable purchase of the rider during its use. Such purchase is unavailable in most conventional bodyboards. It is therefore an object of this invention to provide a bodyboard which improves purchase of the rider.

DISCLOSURE OF THE INVENTION

To address these problems, the present invention provides a bodyboard for use in supporting a rider during travel across the water or surf, such bodyboard including a semi-rigid core covered with topskin which enhances rider purchase. The bodyboard core takes the form of an elongate plank with a riding surface, a planing surface, a forward end, a rear end and a pair of elongate laterally-opposed side edges. The topskin covers the riding surface of the bodyboard core, such topskin being defined with a centralized torso-supporting region which underlies the rider's torso and a perimetric purchase-enhancing region which opposes passage of the rider there across.

Typically, the topskin's torso-supporting region is hourglass-shaped, conforming generally to the desired position of the rider's torso. In the depicted embodiment, the topskin is a multi-layer structure having first and second layers wherein the first layer covers the riding surface of the bodyboard core and the second layer covers the first layer, the second layer defining a centralized aperture through which the first layer projects. Further, each layer may be formed to exhibit a different stiffness characteristic so as to produce a topskin with a more-resilient torso-supporting region and a less-resilient purchase-enhancing region, thereby producing a topskin with differential stiffness characteristics. The torso-supporting region thus may provide a cushioned seat for the rider's torso, the purchase-enhancing region serving as an impediment to uncontrolled rider shift thereacross.

The purchase-enhancing region may further enhance rider purchase by provision of an elbow pad which defines a topographically-contoured elbow well and/or a palm grip which provides a rider handhold. Additionally, a palm well may be defined adjacent the palm grip, the palm well preferably being ergonomically shaped to receive a carpal portion of the rider's hand both in a first orientation with the rider's palm overlying the palm grip and in a second orientation with the rider's palm gripping the side edge of the bodyboard core. The elbow pad, palm grip and palm well all may be formed in the topskin upon assembly thereof, such features being defined by a molding process during which the first and second layers of the topskin are combined.

The bodyboard core also may be adapted to improve board performance, typically by provision of a pair of elongate propulsion channels which transition gradually from a generally planar glide region of the board's planing surface, and/or by provision of a rear end having a pair of rearwardly-projecting side tail-fin portions and a rearwardly-projecting center tail-fin portion which collectively define an undulated tail. The board's riding surface also may be defined with a pair of elongate guides which extend along the riding surface adjacent opposite side edges thereof, thereby opposing passage of the rider over the side edges.

These and additional objects and advantages of the present invention will be more readily understood upon review of the drawings and the detailed description of the preferred embodiment which follows.

BRIEF DESCRIPTION OF THE DRAWINGS

FIG. 2 is a top plan view of the bodyboard shown in FIG. 1.

FIG. 3 is a bottom plan view of the bodyboard shown in FIG. 1.

FIGS. 4A and 4B are isometric views illustrating assembly of a topskin which forms a part of the bodyboard shown in FIG. 1.

FIG. 6 is an enlarged sectional view taken along lines 6—6 of FIG. 2 so as to demonstrate the multi-layer character of preferred embodiment bodyboard.

FIG. 7 is an enlarged sectional view taken along lines 7—7 of FIG. 2 so as to show the contour of an elbow pad defined by the bodyboard's topskin.

FIGS. 8A and 8B are enlarged partial plan views illustrating typical grip orientations of a rider's forward board-gripping hand.

FIG. 9A is an enlarged sectional view taken along lines 9A—9A of FIG. 2 so as to indicate the contour of a palm well formed in the bodyboard's topskin.

FIG. 9B is an enlarged sectional view taken generally along lines 9B—9B of FIG. 2 to further indicate the contour of a palm well formed in the bodyboard's topskin.

FIG. 10 is an enlarged sectional view taken along lines 10—10 of FIG. 2 so as to demonstrate the transverse contour of the bodyboard adjacent its rear end.

FIG. 11 is an enlarged sectional view taken along lines 11—11 of FIG. 3 so as to demonstrate the longitudinal contour of the bodyboard adjacent its rear end.

DETAILED DESCRIPTION OF THE PREFERRED EMBODIMENT

Figure 1:
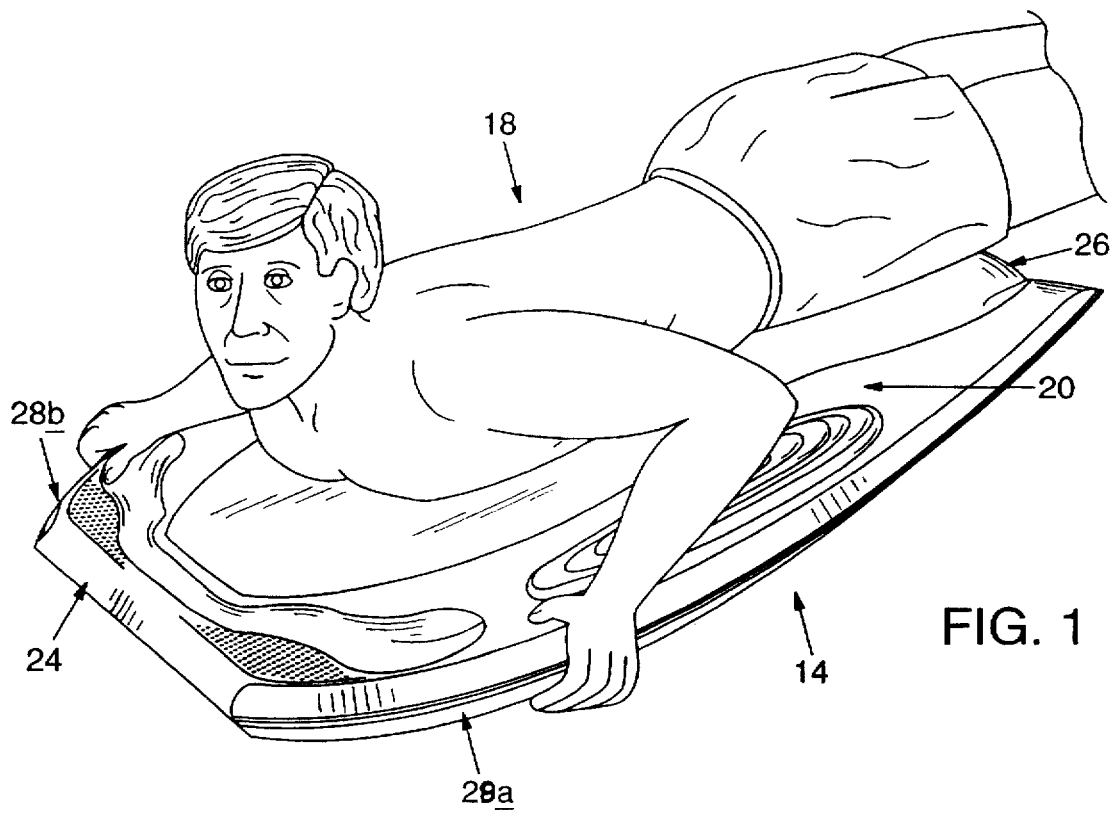
FIG. 1 is a perspective view of a rider positioned on a bodyboard constructed in accordance with the present invention, the rider being positioned in an orientation typical of that employed in the sport of bodyboarding.

Referring initially to FIG. 1, it will be noted that a preferred embodiment of the invented bodyboard has been depicted, such bodyboard being shown generally at 14 with an onboard rider 16. Rider 16 lies generally across an upper surface of the bodyboard, his torso being positioned somewhat centrally on the board so as to provide him with optimal bodyboard control. The rider maintains his position at least in part by gripping the side edges of the board, and by various surface features of the board which will be described in detail below. The board is maneuvered by twisting or bending the board and by controlled shifting of the rider's torso and legs.

Although a rider may mount bodyboard 14 in any of a variety of riding positions, the rider most typically rides the board in a prone position similar to that shown in FIG. 1. The rider thus is positioned with one arm (the rider's left arm in FIG. 1) extending forwardly to grip the board at or near a forward corner thereof, and the other arm (the rider's right arm in FIG. 1) gripping the board along a corresponding side edge thereof. The bodyboard is maneuvered by bending or twisting the board, typically by using the rider's forward elbow (the rider's left elbow in FIG. 1) as a fulcrum about which the board's forward corner may be bent. This may be accomplished using either the left or the right arm. The rider's torso also plays a role in maneuvering the board, typically by controlled shifting of the rider's weight (e.g., pivoting the rider about his waist).

Figure 5:
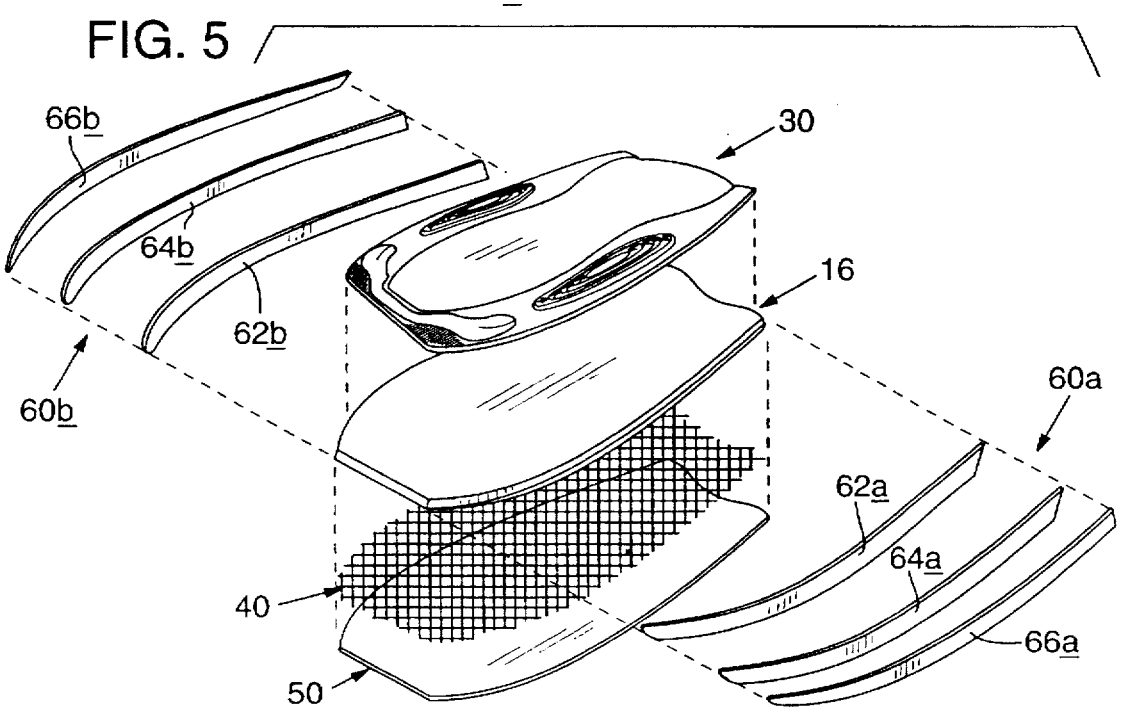
FIG. 5 is an exploded isometric view demonstrating construction of the preferred embodiment bodyboard.

Bodyboard 14 takes the form generally of an elongate plank which is defined by the bodyboard's core 18 (FIG. 5). In the preferred embodiment, core 18 is substantially planar, and is constructed of a semi-rigid, water-buoyant foam material such as WAVECORE™, a product which is made by Dow Plastics. The core is dimensioned to support a rider of average stature, the core typically having a length of approximately 43-inches, a width of approximately 22-inches and a thickness of approximately 2-inches. These dimensions are selected to provide the board with a desired rigidity, such rigidity being determined in part by the thickness of the core and in part by the materials from which the core is made.

In the depicted embodiment, the bodyboard core is formed from a single piece of foam material, but those skilled in the art will understand that it may be constructed using plural components, with or without additional structural support. Further, although the core is constructed of a semi-rigid material, it will be understood that such core is resiliently deformable, and thus will tend to regain its shape even after being bent or twisted by the rider during a "trick" or maneuver.

Referring still to FIG. 1, it will be noted that bodyboard 14 includes a top riding surface 20, a bottom planing surface 22 (FIG. 3), a forward nose end 24, a rear tail end 26, and a pair of laterally-opposed side edges 28a, 28b. It also will be understood that the bodyboard emulates bodyboard core 18 in shape and size, and thus that the bodyboard core includes corresponding riding and planing surfaces, forward and rear ends, and laterally-opposed side edges. The core's riding surface is covered by a differentially-resilient topskin 30 (FIG. 5). The core's bottom planing surface is covered by a board-stiffening mesh layer 40, and a friction-reducing bottom skin 50 (FIG. 5). In the preferred embodiment, the bottom skin is formed from a material such as SURLYN®, a plastic product which is made by Dupont.

Turning now to FIG. 2, a plan view of topskin 30 is provided, such topskin being adapted to improve rider purchase. This is accomplished by provision of a differential topskin which accommodates rider desired rider movement, but impedes undesired rider movement. Topskin 30 thus will be seen to include a centralized torso-supporting region 32 which has a first rider-purchase characteristic, and a perimetric purchase-enhancing region 34 which has a second rider-purchase characteristic. Torso-supporting region 32 accommodates shifting of the rider's torso within the confines of the torso-supporting region. Purchase-enhancing region 34 impedes uncontrolled shift of the rider's torso over the edges of the board.

Focussing initially on torso-supporting region 32. it is to be noted that such region is generally hourglass-shaped, defining a forward section 32a which underlies the rider's chest, a central section 32b which underlies the rider's waist, and a rear section 32c which underlies the rider's hips. The central section narrows from both the forward section and the rear section, the torso-supporting region thus being configured to emulate the shape of the rider's body (see FIG. 1). In the depicted embodiment, the central section narrows to approximately 8-inches, while the forward section reaches a width of approximately 11-inches and the rear section reaches a width of approximately 14-inches. Further, the torso supporting region is relatively smooth, the rider thus being able to maneuver the board by pivoting his torso about his waist without leaving the torso-supporting region.

The torso-supporting region also is resilient, providing the rider with a comfortable "torso landing pad" configured to at least partially absorb the impact which results from high speed maneuvers where the rider's torso rises off the board. Due to its resiliency, the torso-supporting region also will tend to compress under the weight of the rider, typically to a greater extent than in the surrounding purchase-enhancing region.

In the preferred embodiment, the central region is formed of a resilient foam material (such as metallocene polyolefin (MPO)) which has a resiliency of between approximately 16-durometer and 20-durometer. This resiliency alternatively may be achieved by forming the torso-supporting region of another non-foam material, or by employing an air cushion or other similar fluid-filled pad.

As indicated, purchase-enhancing region 34 substantially surrounds the topskin's torso-supporting region, extending perimetrically along both sides and across the front of the board. Like the torso-supporting region, the purchase-enhancing region is formed of a foam material (such as MPO), but the purchase-enhancing region has a resiliency of between approximately 42-durometer and 47-durometer. The purchase enhancing region thus is less resilient than the torso-supporting region, and correspondingly is less compressible than the torso-supporting region, providing an impediment to shift of the rider's torso across the boundaries of the torso-supporting region. In the preferred embodiment, purchase-enhancing region 34 also is provided with a grip-enhancing surface texture which will impede rider shift thereacross.

One advantageous feature of the above-described topskin construction relates to the structural integrity of the bodyboard as a whole. It will be appreciated, for example, that a conventional bodyboard will tend to break or crease at a position approximately midway between its forward end and rear end, typically due to the forces which are encountered during board use. The depicted topskin, however, provides enhanced structural integrity in the vicinity of such midway position, the less resilient purchase-enhancing region of the topskin being at its widest approximately midway between the board's forward and rear ends (in an area corresponding to the torso-supporting region's central section 32b).

Purchase-enhancing region 34 is provided with a pair of elongate, topographically-contoured elbow pads 36a, 36b, each such pad extending adjacent one of the board's opposite side edges in an area near the center of the board. Each elbow pad is raised relative to its surroundings, and is approximately 16-inches in length and 3-inches in width. The elbow pads typically are canted slightly inwardly in a forward direction to mimic the typical orientation of a rider's forearm. The elbow pads are substantially mirror images of one another, each serving to aid in maintaining a stable relationship between the rider and the board by impeding uncontrolled shift of the rider's elbow. Due to their centralized positioning, the elbow pads also serve to strengthen the board, thereby avoiding creasing or breaking of the board.

Purchase-enhancing region 34 also includes a pair of forward palm grips 38a, 38b, each such palm grip being positioned adjacent a forward corner of board, and being contoured to accommodate capture of the rider's palm. In the preferred embodiment, the palm grips are raised, and are given enhanced surface friction characteristics (in the form of projecting bumps 82) which further accommodate capture of the rider's palm. Like the elbow pads, the palm grips are substantially mirror images of one another.

A palm well 39 is defined just behind the palm grips, the palm well extending generally arcuately across the forward portion of the riding surface. The palm well includes a left-hand well portion 39a, a right-hand well portion 39b, and a central well portion 39c which extends therebetween. The well is ergonomically contoured to receive the carpal portion of the rider's forward hand in either a first hand orientation (shown in FIG. 8B) with the rider's palm overlying the palm grip, or a second hand orientation with the rider's palm gripping a side edge of the board (shown in FIG. 8A). These hand orientations are selected in accordance with hand orientations which accommodate typical bodyboard maneuvers. The palm well is configured to receive either the rider's left or right hand, the raised edges of the well providing a leverage point for the rider's thumb.

FIGS. 9A and 9B illustrate the contour of the well in cross sections corresponding to the hand positions shown in FIGS. 8A and 8B, respectively. The depth of the well is between approximately ⅛-inch and ⅜-inch across the board, but the slop of the leading edge of the well typically is steeper in the center portion than it is in either the left-hand portion or the right-band portion.

As indicated in FIGS. 4A and 4B, the depicted bodyboard's topskin may be constructed as a multi-layer structure which includes a first layer 32' formed from a first resiliency and a second layer 34' having a second resiliency which is less resilient than the first resiliency. The topskin is constructed by cutting an hourglass-shaped aperture 34a' in second layer 34', and then combining the second layer with the first layer (e.g., by beat molding, and/or using an adhesive substance) so as to define a composite topskin structure 30'. One portion 31a of the first layer extends through aperture 34a. Another portion 31b underlies the second layer. The various surface contours (i.e., elbow pads, palm grips and palm well) are formed at the time the first and second layers are combined (preferably by molding the surface contours). The composite topskin 30' is then trimmed (as indicated generally by dashed line 33) to fit the riding surface of the core, and secured to such surface (typically using an adhesive substance or heat).

Prior to such combination, each layer will typically be approximately ¼-inch thick. The composite topskin structure, however, also will be approximately ¼-inch thick due to compression of each layer upon such combination. Because the first layer is more resilient (softer) than the second layer, the first layer will be compressed more than the second layer. The first layer projects through the hourglass-shaped aperture in the second layer so as to define the topskin's torso-supporting region. The second layer defines the topskin's purchase-enhancing region.

FIG. 5 is an exploded isometric view demonstrating assembly of the invented bodyboard. As indicated, the bodyboard includes a bodyboard core 16 with a top riding surface, topskin 30 being applied thereto. The core also includes a bottom planing surface (not shown) to which mesh 40 and bottom skin 50 are applied. A first rail structure 60a (including rail layers 62a, 64a, 66a) is applied to one side edge of the core. A second rail structure 60b (including rail layers 62b, 64b, 66b) is applied to the other side edge of the core. A cross section of a fully assembled board is shown in FIG. 6. Assembly may be accomplished using an adhesive substance, heat, or any other suitable non-water-soluable adhesion method.

Referring now to FIG. 6, it will be noted that elbow pad 36a is shown in cross section. FIG. 7 shows elbow pad 36b in cross section, the cross section of FIG. 7 being transverse to the cross section taken in FIG. 6. As indicated, each elbow pad includes a riser 70a (70b), such riser being positioned to elevate the board's topskin. The topskin, however, may be elevated without a riser by a modified molding process. The hand grips similarly may be formed using risers, or may be formed by a molding process.

As indicated, the topskin is molded to provide topographically-contoured elbow pads, each characterized by graduated steps 74a, 76a, 78a (74b, 76b, 78b) which extend concentrically between a raised perimeter section 72a (72b) and a recessed center section 80a (80b) to define an elbow well. The depth of the elbow well typically is on the order of approximately ⅛-inch to ⅜-inch deep. As indicated in FIG. 7, the steps are more gradual front-to-back than they are side-to-side.

Turning now to a discussion of the board's rear end, it is to be noted that such rear end defines a bat-like tail, such tail including a pair of rearwardly-projecting side tail-fin portions 26a, 26b and a rearwardly-projecting center tail-fin portion 26c so as to define a generally undulated tail. As indicated in FIG. 2, the side tail-fin portions angle linearly toward the center tail-fin portion. The center tail-fin portion arcs between opposite side tail-fin portions. The center tail-fin portion extends rearwardly to approximately the same degree as the side tail-fin sections, thereby providing the rider with enhanced belly support, and improved ability to drive the rear corners into the water. The riding surface typically will taper arcuately toward the planing surface in order to enhance rider comfort.

The depicted bodyboard also is provided with a pair of elongate propulsion channels 92a, 92b, each extending along the board's planing surface adjacent one of the side edges. Each channel is transversely arcuate, transitioning gradually from a generally planar glide region 90, beginning approximately 4-inches to 8-inches from the rear end of the board. The propulsion channels are approximately 2-inches to 4-inches wide, each reaching a depth of approximately ⅟₁₆-inch to ⅛-inch deep. Propulsion channel 92b is shown cross sectionally in FIGS. 10 and 11.

FIG. 10 demonstrates yet another feature of the invention, it being apparent that riding surface of the board is provided with a pair of elongate guides 86b (a similar guide is provided adjacent the opposite side edge). Each guide takes the form of a dip in the board's riding surface which extends along the riding surface adjacent a side edge thereof so as to oppose passage of the rider over that side edge. The lateral position of the dip conforms generally to the lateral position of the interface between the torso-supporting region and the purchase-enhancing region of the topskin.

While the present invention has been shown and described with reference to the foregoing preferred embodiment, it will be apparent to those skilled in the art that other changes and form and detail may be made without departing from the scope and spirit of the invention as defined in the appended claims.

It is claimed:

1. A bodyboard for use in supporting a rider during travel in ocean surf, the bodyboard comprising:
   an elongate plank defining a semi-rigid bodyboard core with a riding surface, a planing surface, a forward end, a rear end and a pair of elongate laterally-opposed side edges; and
   a multi-layer topskin covering the riding surface of the bodyboard core, the topskin including a first layer and a second layer, the second layer defining an hourglass-shaped aperture through which the first layer protects to define a centralized torso-supporting region of generally hourglass shape and a purchase-enhancing region which extends substantially along a perimeter of the torso-supporting region to impede uncontrolled rider shift.

2. The bodyboard of claim 1, wherein the torso-supporting region is more resilient than the purchase-enhancing region.

3. The bodyboard of claim 1, wherein the torso-supporting region extends substantially along a length of the bodyboard core, the torso-supporting region defining a forward section for underlying the rider's chest, a central section for underlying the rider's waist and a rear section for underlying the rider's hips, the central section narrowing from both the front section and the rear section.

4. The bodyboard of claim 1, wherein the first layer is more resilient than the second layer.

5. The bodyboard of claim 1, wherein the purchase-enhancing region defines an elbow pad which is topographically contoured to enhance purchase of the rider's elbow.

6. The bodyboard of claim 5, wherein the elbow pad includes a raised perimeter section and a recessed center section, the elbow pad defining an elbow well characterized by graduated steps between the raised perimeter section and the recessed center section.

7. A bodyboard for use in supporting a rider during travel in ocean surf, the bodyboard comprising:
   an elongate plank defining a semi-rigid bodyboard core with a riding surface, a planing surface, a forward end, a rear end and a pair of elongate laterally-opposed side edges; and
   a multi-layer topskin covering the riding surface of the bodyboard core, the topskin including a first layer having a first resiliency and a second layer having a second resiliency which is less resilient than the first resiliency, the first layer covering the riding surface of the bodyboard core and the second layer covering the first layer, the second layer defining a centralized hourglass-shaped aperture through which the first layer projects to define a topskin with a centralized torso-supporting region and a perimetric purchase-enhancing region which surrounds the torso-supporting region, the torso-supporting region having increased resiliency relative to the purchase-enhancing region.

8. The bodyboard of claim 7, wherein the purchase-enhancing region defines an elbow pad which includes a raised perimeter section and a recessed center section, the elbow pad defining an elbow well characterized by graduated steps between the raised perimeter section and the recessed center section, thereby topographically contouring the elbow pad to enhance purchase of the rider's elbow.

9. The bodyboard of claim 8, wherein the purchase-enhancing region further defines a frictionally-enhanced forward palm grip adjacent a forward corner of the bodyboard core and a palm well immediately behind the forward palm grip, the palm well being ergonomically contoured to receive a carpal portion of the rider's hand in a first orientation with the rider's palm overlying the palm grip and in a second orientation with the rider's palm gripping the side edge of the bodyboard core.

10. The bodyboard of claim 9, wherein the topskin is formed by laminating the first layer to the second layer, the elbow pad, palm grip and palm well being molded into the topskin during such laminating.

11. The bodyboard of claim 7, wherein the bodyboard core defines a planing surface with a substantially planar glide region and a pair of elongate propulsion channels which extend along the planing surface adjacent opposite side edges of the bodyboard core.

12. The bodyboard of claim 7, wherein the rear end of the bodyboard core has a pair of rearwardly-projecting side tail-fin portions and a rearwardly-projecting center tail-fin portion, each side-fin portion angling from a side edge toward the center tail-fin portion and the center tail-fin portion arcing between opposite side-fin portions, thereby defining an undulated tail.

13. The bodyboard of claim 7, wherein the bodyboard core defines a riding surface with a pair of elongate guides which extend along the riding surface adjacent opposite side edges of bodyboard core, thereby opposing passage of the rider over the side edges.

14. A bodyboard for use in supporting a rider during travel in ocean surf, the bodyboard comprising:
 an elongate plank defining a semi-rigid bodyboard core with a riding surface, a planing surface, a forward end, a rear end and a pair of elongate laterally-opposed side edges, the planing surface having a substantially planar glide region and a pair of elongate propulsion channels which transition gradually from the glide region adjacent opposite side edges of the bodyboard core, and the rear end having a pair of rearwardly-projecting side tail-fin portions and a rearwardly-projecting center tail-fin portion which define an undulated tail; and
 a multi-layer topskin covering the riding surface of the bodyboard core, the topskin including a first layer having a first resiliency and a second layer having a second resiliency which is less resilient than the first resiliency, the first layer covering the riding surface of the bodyboard core and the second layer covering the first layer, the second layer defining a centralized aperture through which the first layer projects to define a topskin with a more-resilient centralized torso-supporting region and a less-resilient perimetric purchase-enhancing region, the purchase-enhancing region defining an elbow pad with an elbow well topographically contoured to enhance purchase of the rider's elbow and a palm grip to enhance purchase of the rider's hand, and a palm well immediately behind the palm grip to receive a carpal portion of the rider's hand both in a first orientation with the rider's palm overlying the palm grip and in a second orientation with the rider's palm gripping the side edge of the bodyboard core.

15. The bodyboard of claim 14, wherein the bodyboard core riding surface defines a pair of elongate guides which extend along the riding surface adjacent opposite side edges of bodyboard core, thereby opposing passage of the rider over the side edges.

16. A bodyboard for use in supporting a rider during travel in ocean surf, the bodyboard comprising:
 an elongate plank defining a semi-rigid bodyboard core with a riding surface, a planing surface, a forward end, a rear end and a pair of elongate laterally-opposed side edges; and
 a multi-layer topskin covering the riding surface of the bodyboard core, the topskin including a first layer having a first resiliency and a second layer having a second resiliency which is less resilient than the first resiliency, the first layer covering the riding surface of the bodyboard core and the second layer covering the first layer, the second layer defining a centralized aperture through which the first layer projects to define a topskin with a centralized region and a perimetric region which surrounds the centralized region, the centralized region having increased resiliency relative to the perimetric region.

17. The bodyboard of claim 16, wherein the topskin is formed by laminating the first layer to the second layer.

18. A bodyboard for use in supporting a rider during travel in ocean surf, the bodyboard comprising:
 an elongate plank defining a semi-rigid bodyboard core with a riding surface, a planing surface, a forward end, a rear end and a pair of elongate laterally-opposed side edges; and
 a topskin covering the riding surface of the bodyboard core, the topskin including a centralized torso-supporting region of generally hourglass shape and a perimetric purchase-enhancing region which surrounds the torso-supporting region to impede uncontrolled rider shift, the purchase-enhancing region defining a forward palm grip adjacent a forward corner of the bodyboard core, the forward palm grip having enhanced surface friction characteristics to provide for capture thereof by the rider's palm, the purchase-enhancing region further defining a palm well immediately behind ergonomically contoured to receive a carpal portion of the rider's hand in a first orientation with the rider's palm overlying the palm grip and being ergonomically contoured to receive the carpal portion of the rider's hand in a second orientation with the rider's palm gripping the side edge of the bodyboard core.

19. A bodyboard for use in supporting a rider during travel in ocean surf, the bodyboard comprising:
 an elongate plank defining a semi-rigid bodyboard core with a riding surface, a planing surface, a forward end, a rear end and a pair of elongate laterally-opposed side edges, the planing surface having a substantially planar glide region and a pair of elongate propulsion channels, each propulsion channel extending along the planing surface adjacent one of the side edges; and
 a topskin covering the riding surface of the bodyboard core, the topskin including a centralized torso-supporting region of generally hourglass shape and a perimetric purchase-enhancing region which surrounds the torso-supporting region to impede uncontrolled rider shift.

20. A bodyboard for use in supporting a rider during travel in ocean surf, the bodyboard comprising:
 an elongate plank defining a semi-rigid bodyboard core with a riding surface, a planing surface, a forward end, a rear end and a pair of elongate laterally-opposed side edges, the riding surface including a pair of elongate guides which extend along the riding surface adjacent opposite side edges of the bodyboard core, thereby opposing passage of the rider over the side edges; and a topskin covering the riding surface of the bodyboard core, the topskin including a centralized torso-supporting region of generally hourglass shape and a perimetric purchase-enhancing region which surrounds the torso-supporting region to impede uncontrolled rider shift.

21. A bodyboard for use in supporting a rider during travel in ocean surf, the bodyboard comprising:

an elongate plank defining a semi-rigid bodyboard core with a riding surface, a planing surface, a forward end, a rear end and a pair of elongate laterally-opposed side edges, the rear end having a pair of rearwardly-projecting side tail-fin portions and a rearwardly-projecting center tail-fin portion, thereby defining an undulated tail; and a topskin covering the riding surface of the bodyboard core, the topskin including a centralized torso-supporting region of generally hourglass shape and a perimetric purchase-enhancing region which surrounds the torso-supporting region to impede uncontrolled rider shift.

22. The bodyboard of claim 21, wherein each side tail-fin portion angles linearly toward the center tail-fin portion and the center tail-fin portion arcs between opposite side tail-fin portions.

* * * * *